June 29, 1943.  R. S. BROWN  2,322,823
AIR BRAKE
Filed June 4, 1942    2 Sheets-Sheet 1

Inventor
Robert S. Brown
Attorneys

June 29, 1943.     R. S. BROWN     2,322,823
AIR BRAKE
Filed June 4, 1942     2 Sheets-Sheet 2

Inventor
Robert S. Brown
By Dodge
Attorneys

Patented June 29, 1943

2,322,823

UNITED STATES PATENT OFFICE 2,322,823

AIR BRAKE

Robert S. Brown, Watertown, N. Y., assignor to The New York Air Brake Company, a corporation of New Jersey Application June 4, 1942, Serial No. 445,773

8 Claims. (Cl. 303—68)

This invention relates to automatic air brakes and particularly to a release valve operable to release the brakes on a car after the car has been set out of the train while serving to conserve the charges in the local reservoirs on the car.

The invention is in the nature of an improvement on the device described and claimed in the allowed application of Baker and Thompson, Serial No. 404,556, filed July 29, 1941, now Patent #2,287,775 granted June 30, 1942, owned by applicant's assignee.

The invention offers improvement in two respects. It prevents undesired reapplication of the brakes when a car whose brakes have been released by its use, is later connected in a charged train brake system. The release valve is held to its seat by emergency or supplemental reservoir pressure and hence can never be blown from its seat by any pressure available in a brake application.

The device can be used with various brake controlling valve devices, particularly those of the multiple reservoir type, but was designed for use with freight brakes including the AB brake valve, now standard on American railroads. The improved release valve can be applied to existing AB brake valves by inserting a suitably ported filler piece between the standard pipe bracket and the service portion of the brake valve. This filler piece affords connection with the brake pipe port and emergency reservoir port and interposes the release valve (which is carried by the filler piece) in the brake cylinder port.

The invention as so embodied and applied to the AB valve will now be described in connection with the accompanying drawings, in which Fig. 1 is a diagrammatic section through the filler piece and release valve, showing normal or running position.

Fig. 5 is a small elevation indicating essential braking components, and the preferred mode of mounting the release valve in functional relation thereto.

In Fig. 5 the brake pipe appears at 1, the brake cylinder at 2, the auxiliary reservoir at 3, the emergency reservoir at 4, the pipe bracket at 6, emergency portion at 5, and service portion at 7. These parts are connected as usual, except that a filler piece 8 carrying the body 9 of the release valve is interposed between pipe bracket 6 and service portion 7.

Figure 1:
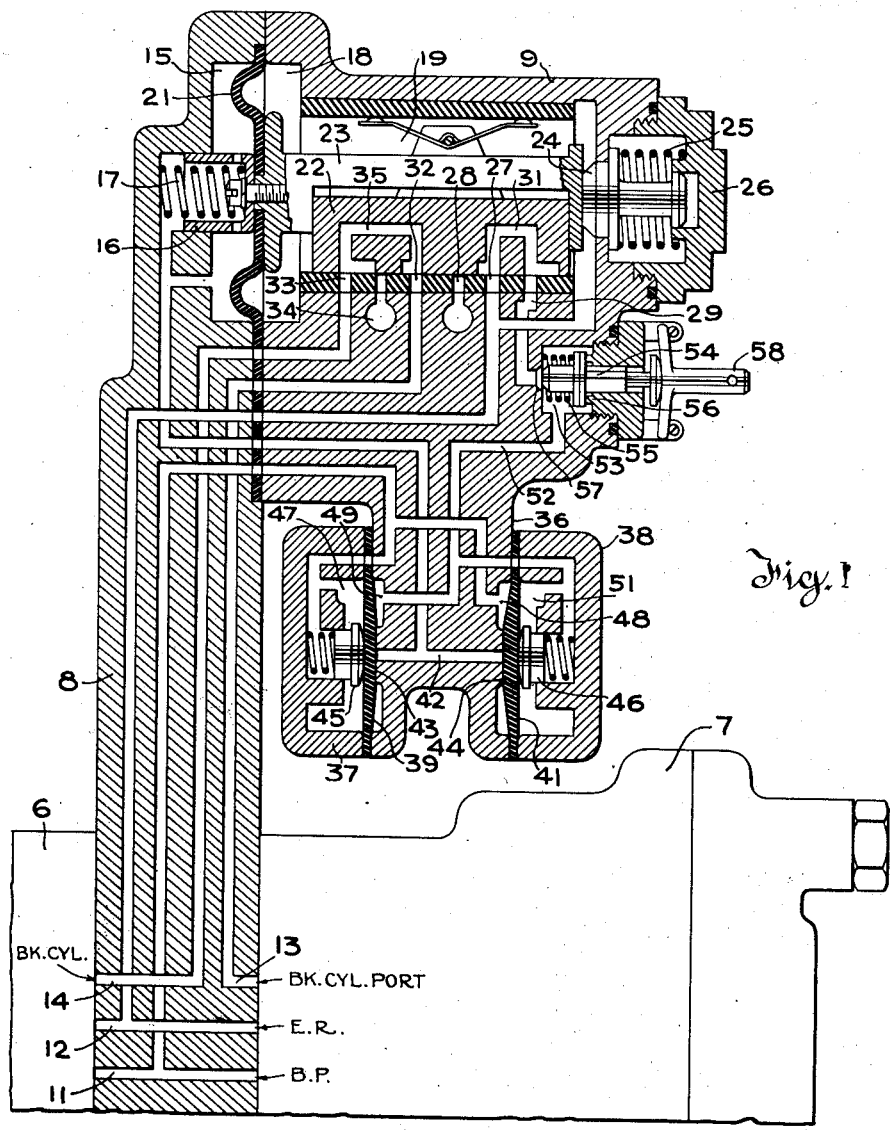
Figure 2:
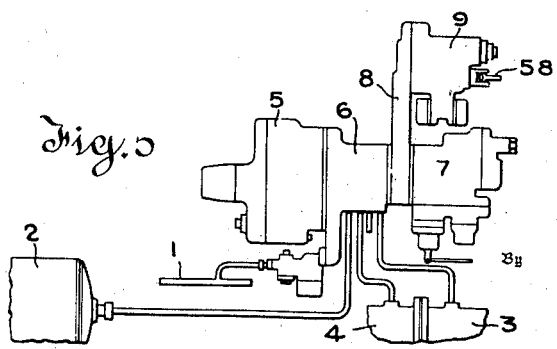
Fig. 2 is a similar view showing venting position.
Figure 2:
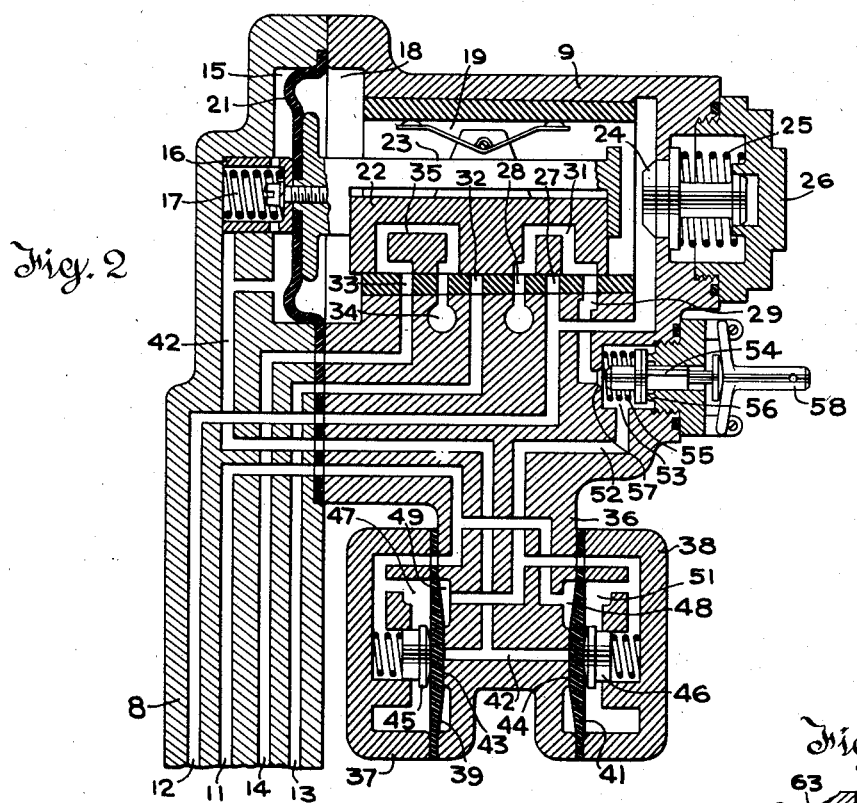

Refer now particularly to Figs. 1 and 2 for details of the preferred embodiment of the release valve.

The release valve requires a connection to the brake pipe, a connection to the auxiliary reservoir, and connections by which the vent valve may be interposed in the path of flow between the AB brake valve and the brake cylinder. Since the brake pipe passage, emergency reservoir passage and brake cylinder passage pass from the pipe bracket 6 to the service portion 7, it is conveniently possible to make the desired connections by porting an interposed filler piece to mate with these ports and to afford the necessary connections therewith. The connections could be made in various other ways, and hence the filler piece is simply a convenient expedient and not of controlling importance.

To avoid complicating the drawings by diagramming familiar details of the AB valve, the porting of the filler piece alone is diagrammed. Thus passage 11 is interposed in the brake pipe passage and passage 12 is interposed in the emergency reservoir passage, and each has a branch leading through the filler piece to housing 9 of the release valve.

Passage 13 connects with the brake cylinder port in the service portion 7 of the AB valve while passage 14 connects with the passage in the pipe bracket 6 which is connected directly with the brake cylinder. These passages also have each a branch leading through filler piece 8 to body 9.

The basic function of the release valve is to connect passages 13 and 14 (running condition) or on occasion to disconnect 13 from 14, blank 13 and vent 14 to atmosphere (venting condition).

Formed in filler piece 8 is a chamber 15 with a guide for thimble 16 and its loading spring 17, opposed to chamber 15 a similar chamber 18 is formed in body 9 and this communicates with slide valve chamber 19.

A flexible diaphragm 21 separates the chambers 15 and 18. It has marginal extensions which serve as a gasket between filler piece 8 and body 9. The chamber 19 is bushed as indicated, the bushing affording a ported seat for the slide valve 22. This valve is closely confined in a notch in valve stem 23 which is suitably guided in the bushing and which has an enlarged head connected through the center of diaphragm 21 with the thimble 16 so as to be guided by the thimble and biased to the right by spring 17. A shouldered stop 24 with sustaining spring 25 is mounted in the threaded plug 26 which closes the right end of the slide valve chamber. The stop defines normal position of the slide valve (Fig. 1) and cushions its arrest in this position.

The porting of slide valve 22 and its seat is diagrammed as if all the ports lay in the plane of section, so that the various flow paths may be traced readily. Various more compact portings may readily be evolved.

The branch of emergency reservoir passage 12 leads to slide valve chamber 19 and to port 27 in the slide valve seat. Adjacent this is an exhaust port 28 and a port 29 which for lack of a better name will be called the pilot port. The slide valve is formed with a loop port 31 which in normal or running position (Fig. 1) connects the emergency reservoir port 27 and pilot port 29 and in venting position (Fig. 2) connects the pilot port 29 to exhaust port 28, the emergency port 27 being then blanked.

The branches of passages 13 and 14 lead respectively to ports 32 and 33 in the slide valve seat. Between these is an atmospheric exhaust port 34. A loop port 35 connects ports 32 and 33 in running position (Fig. 1) and in venting position (Fig. 2) connects the brake cylinder port 33 to exhaust port 34. Port 32 is then blanked by the slide valve.

Carried by an extension 36 of housing 9 is a double diaphragm controlling valve. Clamped against opposite faces of extension 36 by chambered caps 37 and 38 are two flexible diaphragms 39 and 41. A control passage 42 leads from chamber 15 to control valve seats 43 and 44 against which respectively the diaphragms 39 and 41 are pressed by spring urged plungers 45 and 46 which are guided in caps 37 and 38 respectively.

Within cap 37 is a chamber 47 and surrounding seat 44 is an annular chamber 48, both connected to the branch of brake pipe passage 11. Hence brake pipe pressure is effective to urge both diaphragms 39 and 41 to the right.

Surrounding seat 43 is an annular chamber 49 and within cap 38 is a chamber 51 both connected by passage 52 with pilot chamber 53 so that pressure developed in the chamber 53 will urge both diaphragms 39 and 41 to the left.

In the chamber 53 is a double beat pilot poppet valve 54 biased by a spring 55 and pressure in chamber 53 against an atmospheric vent-controlling valve seat 56. This valve may be manually shifted to close against a seat 57 which controls communication between chamber 53 and pilot port 29. A double tilt actuator 58 may be actuated to shift the valve and the effect is to disconnect port 52 from port 29 and vent port 52.

*Operation Figures 1 and 2*

Before the brake system is charged, spring 17 will hold the slide valve in the position of Figure 1 and both of the diaphragms 39 and 41 will seal against the seats 43 and 44. In charging the system, brake pipe pressure rises first. The effect will be to unseat the diaphragm 41 and charge the space 15 to the left of the diaphragm 21 by way of the control port 42. Since in the AB brake valve the emergency reservoir is charged through the slide valve chamber of the service portion, it will be obvious that emergency reservoir pressure will rise more slowly than brake pipe pressure. Hence, since the slide valve chamber 19 of the release valve is charged from the emergency reservoir the slide valve 22 will be held continuously in its right hand position, Figure 1.

When the system is fully charged and the brakes are released, brake pipe pressure and emergency reservoir pressure will be approximately equal but the spring 17 will then maintain the position of slide valve 22. The diaphragms 39 and 41 will remain seated against the seats 43 and 44. If brake pipe pressure is reduced to cause an application of the brakes, the diaphragm 39 will move away from its seat because it is subject on its right hand side to emergency reservoir pressure communicated from passage 12, and port 27 through loop 31 in the slide valve, pilot port 29, chamber 53, and pilot passage 52. However, this merely maintains the pressure in the chamber 15.

Assume now that a train including a car equipped with the valve of Figures 1 and 2 is brought into a yard and stopped and that the car so equipped is to be cut out of the train. The operation of cutting it out follows the present standard practice which results in the venting of the brake pipe on that particular car. The AB brake valve moves to emergency position. With an emergency application, the diaphragm 39 moves away from the seat 43 so that emergency reservoir pressure acts on both sides of diaphragm 21. Consequently the valve 22 remains in the position of Figure 1, just as it does during emergency applications made while the car is connected in the train. The switchman then operates actuator 58 to shift the valve 54 inward for a brief period. The effect of this is to close the connection from the emergency reservoir by way of port 27, port 31 and port 29 to the chamber 53, and to vent the chamber 53.

The consequent venting of port 52 and chamber 51 causes diaphragm 41 to move to the right, venting chamber 15 to atmosphere by way of port 42 past seat 44 to brake pipe passage 11 which is then open to atmosphere. Since emergency reservoir pressure is effective in chamber 19, the diaphragm 21 shifts the valve 22 to the left, that is, to the position of Figure 2. In this position the pilot port 29 is connected to atmosphere so that the return of valve 54 to its normal position will not restore the slide valve.

The emergency port 27 is blanked and at the same time the brake cylinder port 32 leading from the AB valve is blanked, while the port 33 leading to the brake cylinder is connected to atmosphere by way of ports 33, 35, 34. This releases the brakes and they will remain released with the reservoir charges trapped until the brake pipe on that car is again charged. When the car is again connected to a charged train, pressure in the brake pipe passage 11 and its branches will start to rise. The space 51 to the right of diaphragm 41 is at atmospheric pressure since port 29 is connected to exhaust port 28 by way of loop port 31. Consequently the rising brake pipe pressure will force diaphragm 41 from seat 44 and charge chamber 15 to the left of diaphragm 21. However, the diaphragm is subject on its right side to emergency reservoir pressure and spring 17 cannot shift the valve 22 to the right until brake pipe pressure approaches emergency reservoir pressure. Before this occurs, the AB valve will have shifted to release position.

Consequently the shift of slide valve 22 will not result in an undesired reapplication of the brakes with attendant waste of reservoir air. It should be observed that the slide valve 22 is urged to its seat at all times by emergency reservoir pressure which can never be less than brake cylinder pressure.

Figures 3, 4:
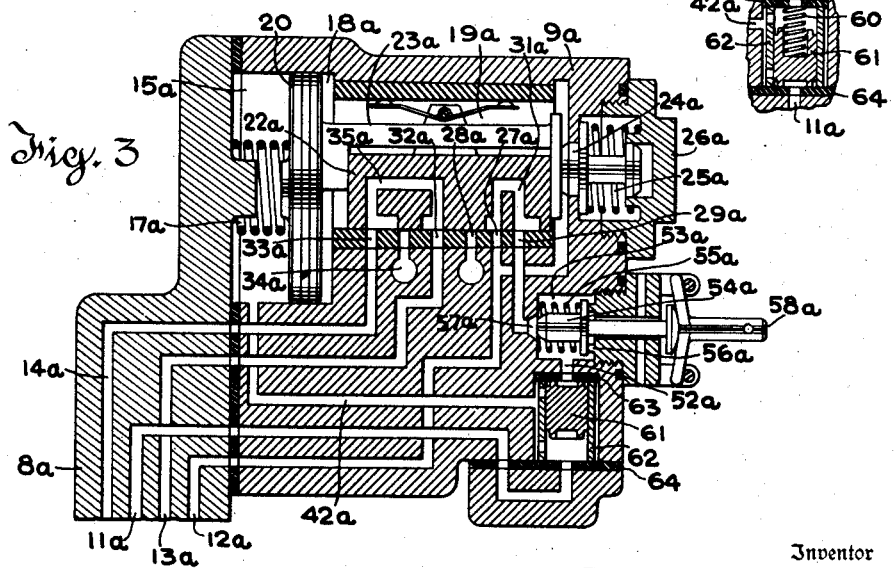
Fig. 3 is a view similar to Fig. 1 showing a modified construction.
Fig. 4 is a modified detail which may be used in the embodiment of Fig. 3.

Embodiment of Figure 3

The embodiment of Figure 3 is the same as that shown in Figures 1 and 2 except that a double seated check valve is substituted for the double diaphragm mechanism and except that a piston 20 is substituted for the diaphragm 21, the piston being the functional equivalent of the diaphragm.

To save repetitious description, parts in Figure 3 which are essentially identical with parts in Figures 1 and 2 are given the same reference numeral with the distinguishing letter *a*. The parts 36 to 51 inclusive are omitted and in their stead the following mechanism is substituted.

A double seated check valve 61 is mounted in a bushing 62 which is spaced from the walls of a chamber formed in the body 9a. At the ends of this chamber are ported gaskets 63 and 64 against which the ends of the sleeve 62 seat. The control passage 42a leads to the space around the bushing 62 and to ports formed through the bushing near its ends, and clearly shown in the drawings.

The port 52a which leads from the pilot chamber 53a leads through the port in the upper gasket 63 and the branch of brake pipe passage 11a leads through the port in the lower gasket 64. The valve 61 is biased to seal against the gasket 64. In Figure 3 the biasing means is simply the weight of the valve 61 itself, but if other, or additional, biasing means is considered necessary, it can be supplied in any suitable way, for example, by the spring 60 indicated in Figure 4.

When the valve 61 is in its upper position as shown in Figure 3, and this is the position assumed during the charging of the system, the brake pipe passage 11a is connected to the control passage 42a and both are disconnected from the pilot passage 52a. Conversely when the valve 61 is in its lowermost position, which is the position it ordinarily assumes, the brake pipe passage is disconnected and the control passage 42a is connected with the pilot passage 52a.

Operation of the type shown in Fig. 3

The operation of this device is substantially the same as that discussed with reference to Figures 1 and 2. With the valve 61 in its lower position, the space 15a is connected with the pilot chamber 53a. The check valve remains in its lower position during brake applications. When the valve 54a is actuated to operate the vent valve after the car is cut out, the shift of the piston and slide valve will establish a self-perpetuation condition, which will persist until the brake pipe is charged.

General considerations

Throughout normal braking operations the double diaphragm valve 38 or the check valve 61, whichever is used, serves to place either brake pipe pressure or emergency reservoir pressure in control in chamber 15 of the release valve, depending upon which of these pressures is higher. When the car is set out and the brake pipe vented to produce an emergency brake application, the manually operated vent valve is actuated to close valve 57 and vent the pilot chamber, thus venting chamber 15 by causing the valve 38 to connect chamber 15 to the open brake pipe, or in case the check valve 61 is employed, no movement of the check valve is necessary since it will be in its lower position, and chamber 15 will be first vented directly through the pilot chamber to exhaust and then by way of port 28 in the slide valve bushing to atmosphere after movement of the slide valve to brake cylinder venting position.

In recharging, as soon as brake pipe pressure is restored sufficiently to overcome the spring loading, the diaphragm 41 moves to the right or, with the check valve 61 the valve will move upward, to permit chamber 15 to charge to brake pipe pressure which eventually approaches the value of emergency reservoir pressure existing in the slide valve chamber, permitting spring 17 to reset the valve.

A study of the two embodiments illustrated will indicate that while a car equipped with this release valve is connected with even a partially charged brake pipe, the vent valve cannot be set to maintain the brakes vented. From this it follows that the vent valve cannot be used to release stuck brakes. In fact, it cannot be used to perform its intended functions unless the brake pipe on the car on which the valve is mounted is vented. Hence the procedure is to operate the release valve after the car is cut out of the train.

The valve prevents the loss of air by reapplication of the brakes when the car is reconnected in the train, and has the advantage that the slide valve 22 can never be blown from its seat by brake cylinder pressure.

While two embodiments of the invention have been described in considerable detail, these embodiments are intended to be illustrative and not limiting, the scope of the invention being defined solely by the claims.

What is claimed is:

1. A release valve mechanism for interposition between the brake cylinder connection of a brake controlling valve device of the automatic type and its brake cylinder, said brake controlling device having a brake pipe connection; said release valve mechanism comprising in combination a releasing valve controlling the flow path to and from the brake cylinder and having a normal position in which said flow path is open and an abnormal position in which the flow path is closed and the brake cylinder is vented; loading means conditioned by the brake pipe when charged to bias said releasing valve to said normal position; manually operable means for reversing said bias and retaining said valve in said abnormal position; and inhibiting means serving normally to protect said biasing means during brake pipe pressure reductions, but serving in response thereto to condition said manually operable means to perform said retaining function.

2. A release valve for use with a brake controlling valve device of the automatic type having application and release positions and including a brake pipe passage which is normally charged and through which control of the device is exercised and a brake cylinder passage through which actuating air flows to and from the brake cylinder; said releasing valve comprising in combination a shiftable valve controlling the brake cylinder passage, and having a normal position in which the passage is open, and an abnormal position in which the passage is closed and the brake cylinder is vented; manually actuated means for causing shifting of the releasing valve to said abnormal position; normally inactive retaining means capable of being rendered effective upon such shifting of the releasing valve to retain it in said abnormal position; restoring means rendered effective by charging from the brake pipe to suspend the action of said retaining means and restore the valve to normal position; and pressure operated inhibiting means serving to charge the shifting means from the brake pipe, protect the shifting means from the effect of subsequent reductions of brake pipe pressure, and in response to venting of the brake pipe condition the retaining means to operate.

3. A brake equipment comprising in combination a normally charged brake pipe, an automatic brake controlling valve device responsive to changes of brake pipe pressure, said device having application and release position and the equipment including local reservoir means and a brake cylinder each connected with said valve device; a releasing valve having a normal position in which it connects the brake cylinder in normal relationship with the other named components and an abnormal position to which it may be shifted and in which it isolates and vents the brake cylinder; a pressure motor of the expansible chamber type having two working spaces, the first of which is subject to local reservoir pressure and the second of which is subject to pressure derived at least in part by flow from the brake pipe, said motor being connected to actuate the release valve; means effective when both said spaces are charged to shift the release valve to said normal position; a manually operable valve for venting the second of said working spaces to reverse the bias on said releasing valve motor; and valve means responsive to the conjoint effect of brake pipe and reservoir pressures, said valve means serving to neutralize the action of said manually operated valve except when the brake pipe is vented and when the brake pipe is vented, serving to place the manually operated valve in control.

4. The combination of a brake controlling valve device of the automatic type having service and emergency application positions and a release position and including a brake pipe passage which is normally charged and through which control of the valve device is exercised; service and emergency reservoirs which are charged from the brake pipe through said device in such manner that after venting of the brake pipe, the emergency reservoir will attain complete charge only after the auxiliary reservoir is completely charged; a brake cylinder with communicating passage through which actuating air flows from the controlling valve device to and from the brake cylinder; a releasing valve controlling the brake cylinder passage and having a normal position in which the passage is open, and an abnormal position in which the passage is closed and the brake cylinder is vented; pressure motor means subject to emergency reservoir pressure and at times to brake pipe pressure, said motor serving to shift the releasing valve to said abnormal position and to restore it to normal position; pressure operated valve means distinct from the brake controlling valve device, responsive at least in part to the differential between brake pipe and emergency reservoir pressures, and controlling said motor means to inhibit shift of the release valve to abnormal position in response to falling brake pipe pressure, and to delay shift to normal position until brake pipe pressure has risen sufficiently to cause the brake controlling valve device to move to release position; and manually operable valve means, associated with said release valve and operable to cause said motor to shift the release valve to abnormal position.

5. The combination of a normally charged brake pipe; a brake controlling valve device of the automatic type capable of producing service and emergency applications; an auxiliary reservoir and an emergency reservoir both charged through said device in such a manner that after an emergency application, the emergency reservoir will attain complete charge only after the auxiliary reservoir is completely charged; a brake cylinder charged under control of the valve device by air derived from the auxiliary reservoir in service applications, and from both said reservoirs in emergency applications; a release valve normally biased to an inactive normal position and shiftable from said normal position to an abnormal position in which it conserves the charges in said reservoirs and vents the brake cylinder; pressure motor means responsive in part to emergency reservoir pressure for shifting said release valve; manually actuated valve means for causing said motor to shift said valve to said abnormal position; normally inactive means rendered active by venting of the brake pipe to cause said motor to retain said valve in said abnormal position; and means responsive to rising brake pipe pressure after venting of the brake pipe for terminating the action of said retaining means.

6. The combination of a brake pipe; a brake controlling valve device connected therewith; at least one reservoir connected with the brake controlling valve device to be charged therethrough from the brake pipe; a brake cylinder connected with the brake controlling valve device to be charged from the reservoir and exhausted, each in response to reductions and increases of brake pipe pressure; a release valve interposed between said brake controlling valve device and the brake cylinder, and having a normal non-releasing position and a releasing and reservoir-charge-retaining position; an expansible chamber motor having two working spaces separated by a movable abutment, the first working space being subject to reservoir pressure and the abutment being connected to shift the release valve; yielding means insufficient to resist reservoir pressure and acting to bias the abutment toward said space and the releasing valve toward normal position; a pilot valve also actuated by said abutment and adapted to establish a pilot connection for equalizing pressure in the two working spaces when the release valve is in said normal position and to interrupt said pilot connection and vent said second working space when the abutment is moved to releasing position; pressure responsive valve means subject to the differential effects of brake pipe pressure and reservoir pressure, and controlling said pilot connection in series with said pilot valve, the last named valve means serving to connect the second working space selectively with the brake pipe and with the pilot connection; and manually operable means for isolating and venting the pilot connection.

7. A brake equipment comprising in combination a brake pipe, a brake controlling valve device controlled thereby; local reservoir means and a brake cylinder each connected with said valve device; a vent valve of the slide type having a normal position in which it connects the brake cylinder in normal relationship with the other components named, and an abnormal position to which it may be moved and in which it isolates and vents said brake cylinder; a pressure motor connected to actuate said valve and having two working spaces, one of which contains said valve and is subject to pressure in the local reservoir means; means biasing said motor in opposition to reservoir pressure toward said normal position, said biasing means alone being insufficient to resist said pressure; means for charging the other working space at least in part from the brake pipe; valve means for preventing reduction of pressure in the second working space as an incident to ordinary reductions of brake pipe pressure; and manually operable means for venting said second working space.

8. The combination of a brake pipe; a brake cylinder; an auxiliary reservoir; an emergency reservoir; a brake controlling valve device having service and emergency positions, a release position and a feed back position assumed in transition from emergency to release position and in which the emergency reservoir is isolated and air is fed back to the brake pipe to accelerate release; an expansible chamber motor having two working spaces separated by a movable abutment, the first working space being in communication with the emergency reservoir; biasing means urging said motor toward the working space just mentioned but insufficient to resist the reservoir pressure acting therein; a release valve connected with said abutment and having a normal position toward which said biasing means urges it and in which it connects the first working space with the second and connects the brake cylinder with the brake controlling valve device, and an abnormal position in which it isolates and vents the brake cylinder and disconnects said working spaces; a manually operable valve serving when operated to disconnect said working spaces and vent the second thereof; and differential pressure valve means normally subject to the opposing effects of brake pipe and emergency reservoir pressures and when so subject, serving to inhibit venting of said second working space by back flow to the brake pipe as an incident to reductions of brake pipe pressure.

ROBERT S. BROWN.